United States Patent [19]
Greskovics

[11] 3,752,962
[45] Aug. 14, 1973

[54] MAGNETIC CARD HANDLING SYSTEM

[75] Inventor: Paul Greskovics, Manhatten Beach, Calif.

[73] Assignee: Western Data Products, Inc., Los Angeles, Calif.

[22] Filed: Mar. 14, 1972

[21] Appl. No.: 234,516

[52] U.S. Cl. .................. 235/61.11 D, 235/61.11 R
[51] Int. Cl. ............................................ G06k 13/07
[58] Field of Search .............. 235/61.11 R, 61.11 D, 235/61.11 E; 340/174.1 H; 250/219 R, 219 Q, 219 D, 219 DC

[56] References Cited
UNITED STATES PATENTS
2,801,796 8/1957 Noon et al. .................. 235/61.11 D
2,357,455 9/1944 Bryce ........................... 235/61.11 D
3,493,728 2/1970 Braden, Jr. et al. ........... 235/61.11 E

*Primary Examiner*—Daryl W. Cook
*Attorney*—Marvin Kleinberg

[57] ABSTRACT

This invention describes a high speed card handling system for writing and reading magnetically encoded information into and from a card. Registration of the card with respect to the heads and moving the card at a constant velocity is achieved by using an endlessly rotating belt that is skewed at an angle with respect to a fixed linear card guide. The endless rotating belt frictionally engages the card and moves the card from the read head to the write head. The endless belt being skewed with respect to the fixed guide continuously urges the moving card against the guide thereby maintaining registration of the card at all times.

8 Claims, 5 Drawing Figures

MAGNETIC CARD HANDLING SYSTEM

This invention relates to a high speed ticket handling mechanism and more particularly to a prepaid magnetic ticket used to enter and exit a restricted area in combination with an automatic turnstile mechanism.

The present invention is concerned primarily with a ticket having the general characteristics of shape and size of the generally accepted credit card in use today. One side of the card is magnetically coded with the desired information relative to the kind of ticket purchased by the consumer.

In the preferred embodiment a prepaid transportation or commutation ticket is purchased by the traveler which contains magnetically encoded information relative to his point of departure and destination. The magnetically encoded information will also indicate whether the ticket is a one way ticket or a round trip ticket or a monthly commutation ticket good for a given number of rides. The destination of the ticket is also recorded and the time of sale together with other necessary bookkeeping and record keeping information.

The above information is recorded or magnetically encoded on the ticket at the time the consumer purchases the ticket. The ticket is presented to an automatic turnstile mechanism having an inlet means for accepting the ticket and an exit means for returning the ticket to the consumer. The present invention is concerned with the means for accepting the ticket at the turnstile and transporting the ticket through the necessary magnetic stations for reading the encoded information to determine validity of the ticket and for writing new magnetic information on the ticket relating to the number of rides remaining if a round trip ticket or commutation ticket.

The ticket handling mechanism must be accurate, fast and reliable. The problems associated with a high speed card transport mechanism are not related to the complexities of computing the necessary information, but rather to the basic problem of maintaining positive control over a moving card through the mechanism itself.

For example, it was soon discovered that moving a relatively small ticket of the size of a credit card through a mechanism at high speed resulted in a phenomenon identified as a flying action of the ticket. This resulted in the ticket actually becoming airborne and attempting to move vertically in an undulating motion with respect to the driving rollers. This movement of the ticket resulted in the external noise in the form of modulation signal being recorded on the ticket during the reading and writing operation and also resulted in a degradation of the signal to noise ratio. Hence, the reading operation of the card was compromised resulting in loss of information and the rejecting of tickets that were otherwise valid.

In addition, moving a small ticket at high speed through the card transport mechanism resulted in a loss of directional control of the ticket otherwise known as a loss of registration. It can be recognized that moving of the card laterally may cause the magnetic track on the card to be displaced from either of the magnetic heads used to read and write information and hence loss of information will occur resulting in the rejection of otherwise valid tickets.

The prior art devices have attempted to solve these problems by using skewed guiding means to register the ticket. Increasing the pressure between the driving rollers so as to move positively hold the ticket as a means of preventing flying of the card during movement was also suggested. These so called fixes while having some temporary benefit unfortunately created additional problems that have otherwise contributed to a general degradation of the overall system.

For example, increasing the tension between the driving rollers to more securely hold the ticket has actually resulted in a decrease in the signal to noise ratio and loss of information. It was discovered that a pinching action between the card and the driving rollers caused the driving rollers to slow down due to the load of the card initially entering the frictional contact area. This loading action caused a transient condition that unduly affects the linearity of the speed control of the driving means.

It can be recognized that varying the velocity of the card as it passes the read and write head will decrease the signal to noise ratio and also induce the external mudulation noise that cannot be measured or otherwise compensated. Additionally it was discovered that as the ticket passed from the frictional control of the driving rollers that a spurting of the ticket took place which actually increased the velocity of the ticket as the ticket was ejected from between the compressed driving rollers.

The problem was again complicated since the ticket now has an increased speed greater than the driving force which again unduly complicates the reading or writing action between the magnetic heads and the ticket. The ticket being given an initial increase in velocity is caught by the next set of driving rollers and hence an increased load is again placed on the driving system which again causes a transient condition that continues to be amplified which contributes to the general degradation of the reading and writing operation.

Brute force attempts to fix the problem by using a bigger motor and heavier pieces of equipment to control the spurting of the ticket have not been successful and have only resulted in systems that are unduly complicated and expensive.

The prior art attempts to solve the problems that are associated with high speed card movements are exemplified by the E. Dillingham et al. U.S. Pat. No. 3,472,373 which illustrate magnetic cards being moved by a plurality of discrete rollers. In such systems the speed of the card is particularly limited by the flying action of the card as it passes over the read and write heads. The main thrust of the Dillingham Patent however, is in the guiding mechanism for achieving registration of the card with respect to the read and write heads.

As illustrated in his FIG. 4 the guiding edge is located at an angle with respect to the driving rollers to thereby achieve a canting or skewing of the card which is continuously urged against the guide edge as a means of achieving registration. The read and write heads are maintained at right angles to the skewed guide rail. The frictional angle between the actual movement of the card and the drive wheel develop the necessary friction to continuously urge the card against the skewed guide rail.

Registration is achieved by the friction generated between the driving roller driving the card in one direction and the card which is moved in a direction that is different from the driving force exerted by the driving roller. The sliding friction between the driving wheel and the card unfortunately produces heat and instability of the moving card resulting in limitations of the speed of the card through the card driving mechanisms.

In the present invention the aforementioned problems are solved in that high speed movement of the ticket is achieved without the tendency of the card to fly or otherwise generate undulating motion. This is achieved by using a rotating endless rotating belt with driving means that frictionally engage the ticket throughout the complete movement of the ticket through the card transport mechanism. The endless belt is skewed at a small angle with respect to a fixed linear guide means. One edge of the magnetically encoded ticket is caused to continuously contact the fixed linear guide means since the rotating endless belt frictionally holds the ticket throughout the complete movement of the ticket through the card transport.

The rotating endless belt is driven by a pair of crowned rollers that are generally oversized to allow the rotating endless belt to travel across the crowned roller while moving the ticket. Since the rotating endless belt is in frictional contact with the magnetically encoded ticket there is no movement of the card relative to the belt.

However, since the ticket is guided along the fixed linear guide means and the endless belt is skewed at an angle with respect to the linear guide means there is a movement of the belt across the face of the crowned driving rollers. As the rotating endless belt moves the card along the guide means and through the card transport mechanism, the belt moves across the face of the rollers opposite to the skewed direction of the belt. The rotating endless belt continues to move across the crowned rollers until the ticket itself is ejected from the tape transport mechanism. As the ticket is ejected, the rotating belt immediately realigns itself on the center of the crowned rollers.

A new ticket being accepted by the card transport mechanism will result in the same action of guiding the card against the guide means. This lateral movement of the belt across the face of the rollers allows the card and the belt to be maintained in a fixed frictional contact with each other during the complete movement of the card through the card transport mechanism. Since there is no passing of the card from one roller to another there is no spurting or accelerating of the card at any time. In addition the card is under direct and positive control at all times and hence, there is no tendency to fly or undulate during movement.

Further objects and advantages of the present invention will be made more apparent by referring now to the accompanying drawings wherein.

Figure 1:
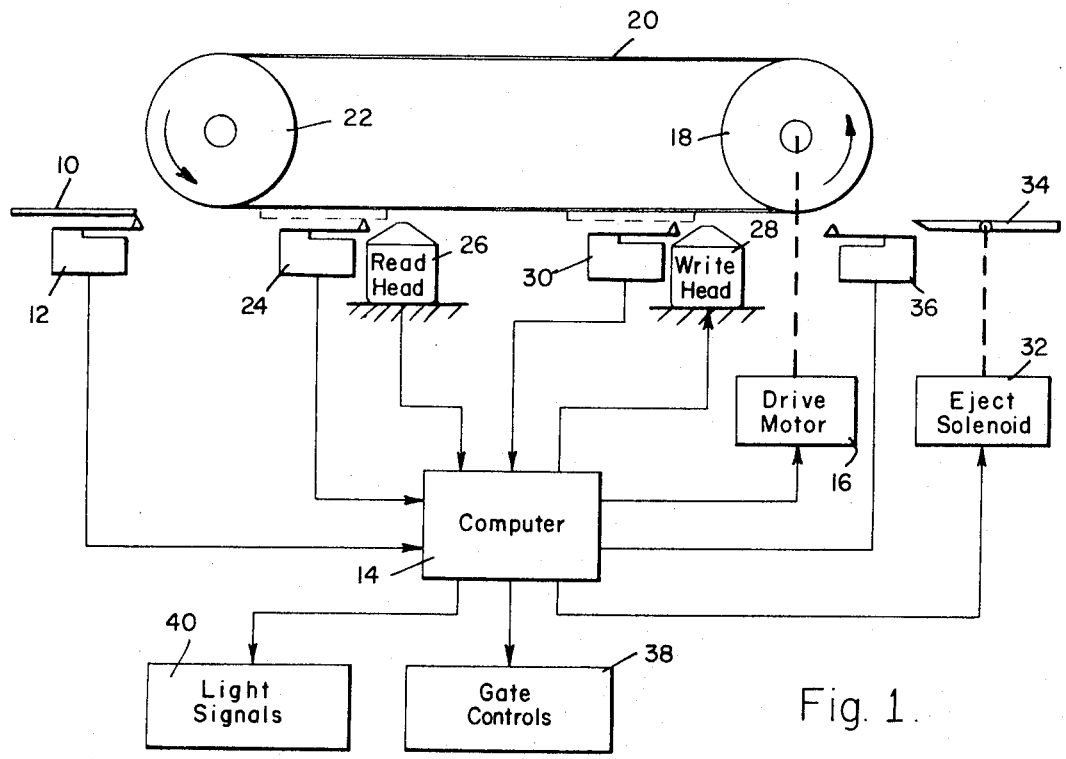
FIG. 1 is a schematic diagram illustrating the peripheral equipment associated with the card transport mechanism.

Referring now to FIG. 1, there is shown a card transport mechanism and the necessary peripheral equipment for handling a magnetically encoded ticket 10.

The prepaid ticket 10 is purchased by the passenger in accordance with his travel needs and may represent a one way ticket or even a monthly commutation ticket good for say forty rides in a given month from a given point of departure to his place of employment and return. All the necessary information pertaining to the specific ticket 10 is magnetically encoded on the ticket at the time of purchase.

It is the purpose of the card transport mechanism to interrogate the ticket 10 and determine if it is valid. External logic means encoded information on the ticket with stored information such as present location of the card transport mechanism, the time of the day, and the rides remaining, to thereby ascertain if the ticket is still valid. If a comparison of all the pertinent information results in a determination that the ticket is valid, then access to the transportation system will be permitted to the passenger via a gate control means of the type described in copending application entitled controllable Turnstile of Walter Joseph Orzechowski, Ser. No. 234,711, filed Mar. 15, 1972 and assigned to the same common assignee.

The associated logic measures the rides remaining on the ticket 10 and recomputes the balance of rides remaining, and writes this new information on the ticket as it passes through the card transport. Similarly should the ticket be expired or otherwise invalid, an eject mechanism is energized which will otherwise capture the ticket to prevent further unauthorized use.

The passenger inserts the ticket 10 into a suitable opening until the card contacts a spring contact associated with switch 12 which indicates to a computer 14 that a card is located at the throat or entry of the card transport mechanism. Closing of the switch 12 causes the computer 14 to energize a drive motor 16 that is mechanically connected to a crowned roller 18. The roller 18 is the driving roller for an endless belt 20 that rotates on the periphery of the driving roller 18 and an idler roller 22.

Pushing the ticket 10 into the opening slot will therefore cause the endless belt 20 to rotate and contact the ticket, for movement along a fixed linear guide means not illustrated. As the ticket 10 approaches a read head 26, a spring contact associated with a switch 24 is closed indicating to the computer 14 that the ticket is in position to be read by the read head 26. Closing of the switch 24 therefore allows the computer 14 to enable the read head 26 to read the encoded information on the ticket 10 as it passes over the read head. This information is fed directly into the computer 14 where the information is otherwise compared and analysed and the determination made whether the ticket is valid.

As the moving ticket 10 approaches the write head 28, a spring contact associated with switch 30 is closed thereby indicating to the computer 14 that the ticket is in position to have new information written into the card by means of the write head. Before the ticket 10 reaches the write head 28, the computer 14 will have determined if the ticket is valid and if so an eject solenoid 32 will not be energized. However, should the card have expired and the ticket is being used to exit the system, then the computer 14 will energize the eject solenoid 32 causing a deflecting lever 34 to be rotated thereby camming the moving ticket 10 into a downward position and hence, captured by a receptacle within the card transport.

In the alternative, the deflecting lever 34 is otherwise not rotated and the moving ticket 10 is free to pass over the deflector and out the normal ejecting means where it is again captured by the passenger.

As the ticket 10 passes from the control of the rotating belt 20 and passes the write head 28, the ticket contacts a spring associated with a switch 36 which indicates to the computer 14 that the ticket has passed through the card transport. A similar switch not illustrated is used on the eject deflector to indicate the capture of a ticket. The computer 14 is programmed to allow the drive motor 16 to operate for a short period of time after the passage of a ticket to otherwise allow a second passenger to insert a ticket without waiting for the guide motor to again start from a stopped position. This has the advantages of speeding operations during times of heavy traffic and prevents a long line of waiting of passengers which would otherwise have to wait for the drive motor 16 to stop and start for each operation.

In the presence of a proper valid ticket 10 as determined by the computer 14 a gate control 38 is energized thereby allowing the passenger to pass through the restricted movement of a control gate into the transportation area provided. Should the computer 14 indicate that the ticket is otherwise invalid then the computer 14 will energize the necessary light signals 40 indicating to the passenger why entrance is denied and how to ask for assistance. The computer 14 is programmed to maintain the light signals for a given period of time before accepting a new ticket 10 by a second passenger.

Figure 2:
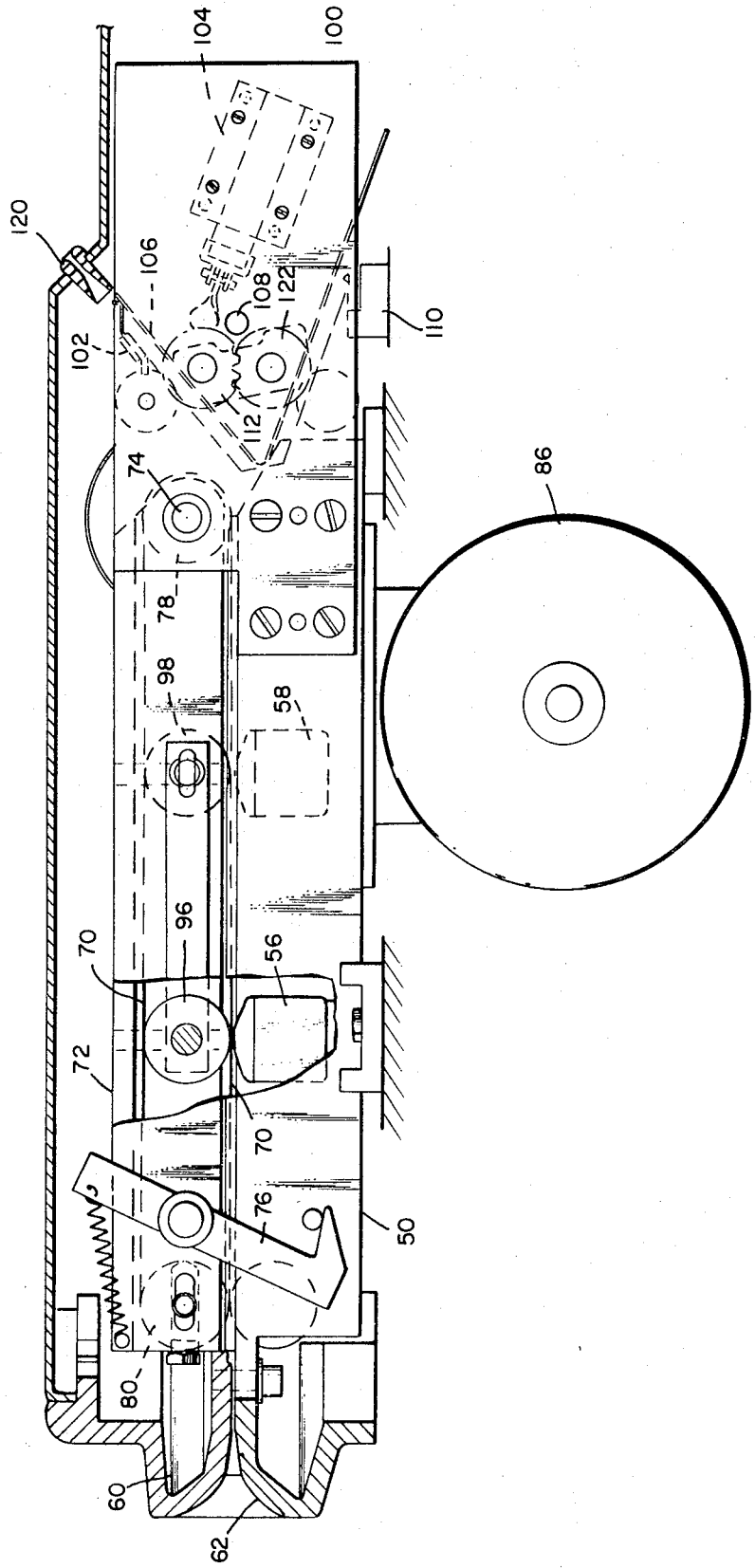
FIG. 2 is a side view of the card transport mechanism.
Figure 3:
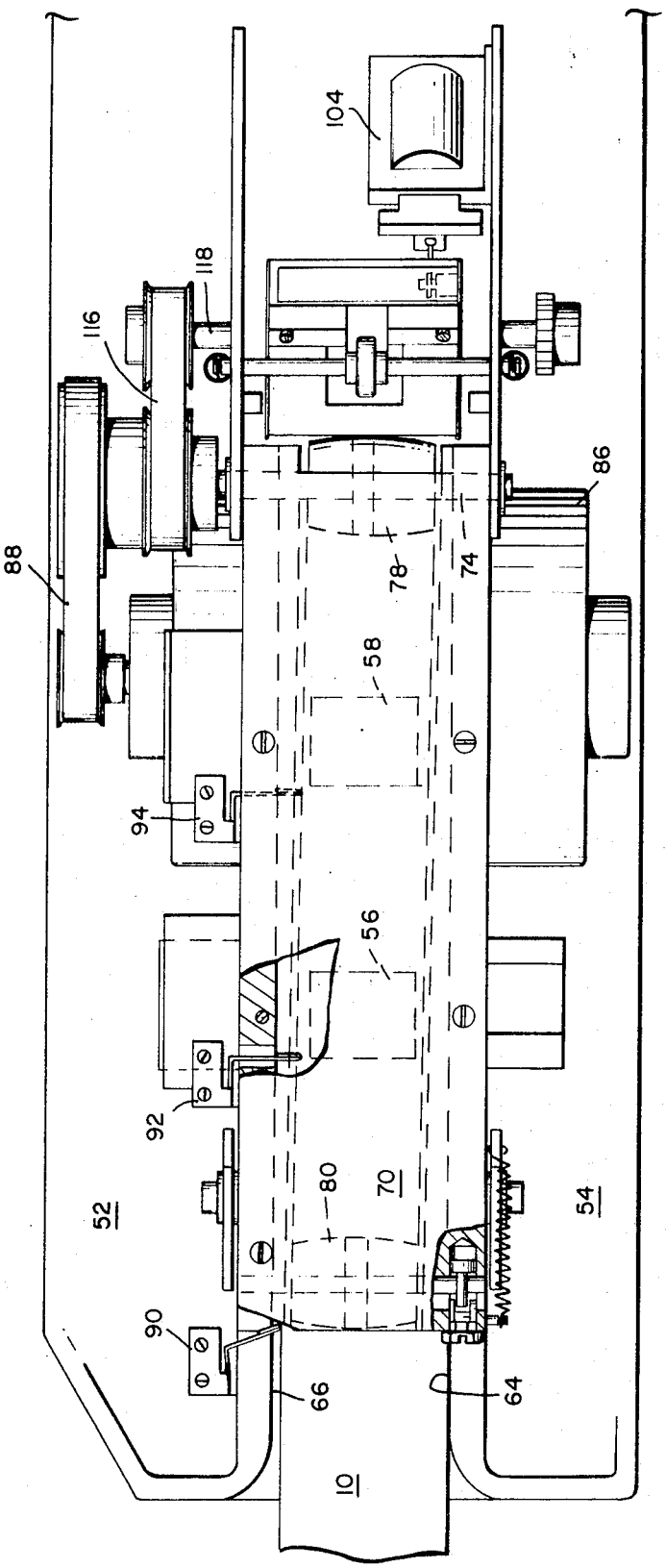
FIG. 3 is a top view of the card transport mechanism illustrated in FIG. 2.

Referring now to FIG. 2 there is shown a side elevation of a preferred card transport mechanism constructed in accordance with this invention. FIG. 3 illustrates a top or plan view of the card transport mechanism illustrated in connection with FIG. 2. Referring to both FIGS. 2 and 3 will more fully illustrate the construction and operation of the invention.

The card transport mechanism is constructed of a bifurcated member 50 having a first side 52 and a second side 54. The sides 52 and 54 are spaced apart a distance substantially equal to the width of the ticket 10 and thereby provide a space below the base member 50 and between sides 52 and 54 for a read head 56 and a write head 58.

A ticket 10 is guided into the throat opening at the entrance of the card transport mechanism by means of the suitable cammed surfaces 60 and 62 which feed the ticket into guides 64 and 66 located on sides 54 and 52 respectively. The spaced apart distances between guides 64 and 66 is a distance that is greater than the width of ticket 10 thereby allowing the ticket to be registered against the preferred linear guide means 64 located on side 54.

Movement of the ticket 10 through the card transport is caused by a rotating endless belt 70 located in a pivotal upper support member 72 that is adapted to pivot about a drive roller shaft 74 that is attached to the bifurcated base member 50. A latch 76 holds the upper member 72 in operating position on the lower base member 50. Located on the drive shaft 74 is crowned drive roller 78 which supports and drives the rotating endless belt 70. The belt 70 rotates about an idler crowned roller 80 located at the front end of the upper member 72.

The driving power for the endless belt is obtained from a drive motor 86 located on the bottom of the base member 50. A timed belt 88 connects the drive motor 86 with the drive shaft 74 wich the crowned drive roller is attached. It can be appreciated therefore that releasing the latching device 76 allows the upper member 72 to pivot around the drive shaft 74 without distributing the endless belt 70 or the drive pulley 88 which drives the shaft 74.

As shown more clearly in connection with FIG. 3 the drive belt 70 is skewed at an angle since the drive shaft 74 is not perpendicular to the edge of the guide rail 64 or 66. The shaft and idler wheel 80 that supports the belt 70 at the front end is at the same angle. When the ticket 10 is inserted within the throat defined by the cammed surfaces 60 and 62 a switch 90 is mechanically actuated by the physical presence of the ticket for energizing the drive motor 86. Energizing the drive motor 86 causes the drive belt 88 to rotate and hence, rotation of the shaft 74 and the drive pulley 88 will cause the belt 70 to rotate. The clearance between the drive belt and the ticket is chosen so that with the ticket in place the drive belt 70 will frictionally engage the ticket 10 and positively move the ticket through the read station and write station until the card is ejected. During this process the ticket 10 will be continuously urged against the linear guide rail 64 located on side 54 due to the belt 70 being skewed with respect to the linear direction of the guide rail. Since the card is positively held by the belt in a friction engaging relationship, the belt 70 is forced to move laterally across the crowned surface of the driving pulley 78. This sideways movement of the belt is a direct result of the belt urging the ticket 10 against the guide rail 64. This feature is more fully illustrated in connection with FIG. 4.

The moving belt 70 will transport the ticket 10 to the read head 56 where the physical presence of the ticket will cause switch 92 to be energized and thereby allow the read head to read the magnetically encoded information on the ticket. In a similar fashion moving the ticket past the read head 56 and to the write head 58 will cause the physical presence of the ticket to close switch 94 to thereby indicate the presence of the ticket for writing purposes.

Improved reading and writing of the magnetically encoded information is achieved by means of a soft resilient idler roller 96 and 98 that is aligned with the read head 65 and write head 58 respectively and located between the rotating endless belt 70 on the upper member 72. The rollers 96 and 98 are positioned so as to contact the rotating belt 70 on the lower most portion only to thereby cause the idler rollers 96 and 98 to rotate. The purpose of the idler rollers is to cause a resilient pressure against the ticket 10 as it passes the read head 56 and the write head 58. Since the idler rollers 96 and 98 are continuously rotating there is no added drag to the driving force on the drive motor 86 and hence, there is no tendency to either load the driving member or to cause a spurting action. In addition the soft resilient surface of the idler rollers insures a close tolerance for reading and writing purposes considered necessary for reliability in a high speed card transport mechanism.

A ticket 10 will therefore pass between the read head 56 and the write head 58 and the deflecting mechanism 100. A switch 102 is closed by the ticket to indicate to the computer that the ticket has been successfully returned to the customer. However, should the logic of the computer indicate that the ticket be captured, then an eject solenoid 104 is energized by the computer which will have the effect of pivoting the ticket guide means 106 about a pivot 108 thereby deflecting the ticket drive means causing the moving ticket 10 to be deflected in a downward direction. The deflected ticket will contact a switch 110 indicating to the computer that the ticket has been captured and has successfully passed through the tape transport mechanism.

The power for ejecting the card either to the normal ejecting position or into the deflected retained position is obtained from the drive motor 86 through the belt drive 88. As shown more clearly in FIG. 3 the drive shaft 74 which drives the endless rotating belt 70 also contains a belt 116 which drives a pulley 118 that provides the driving force for the eject roller 120 as shown in FIG. 2. When a ticket is being returned to the customer, roller 102 will drive the ticket past the deflector mechanism and out to the waiting spring clips 120 that are adapted to frictionally engage and hold the ticket for the customer.

In the event the ticket is to be captured, then the solenoid 104 will be energized and the deflector mechanism 106 will pivot about the shaft 108 causing the lower end of the deflecting mechanism to deflect the ticket in a downward direction. However, in this position, idler 122 which is frictionally driven by driving roller 102 will provide the driving force for causing the ticket 10 to be deflected past the switch 110.

Figure 4A:
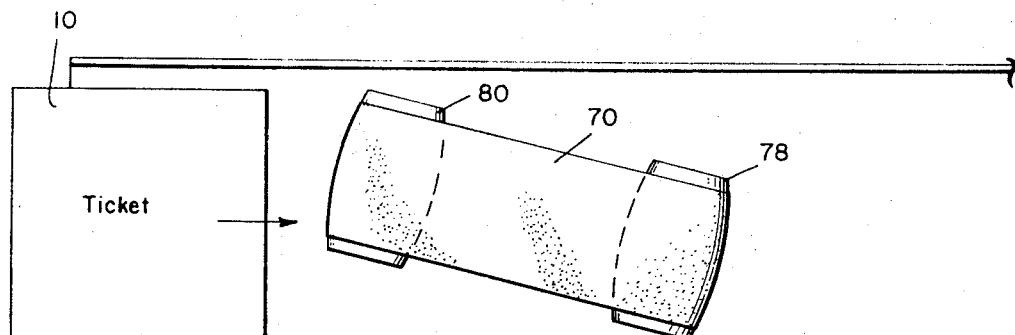
FIG. 4 is a series of drawings illustrating the lateral movement of the endless belt across the crowned driving rollers.
Figure 4B:
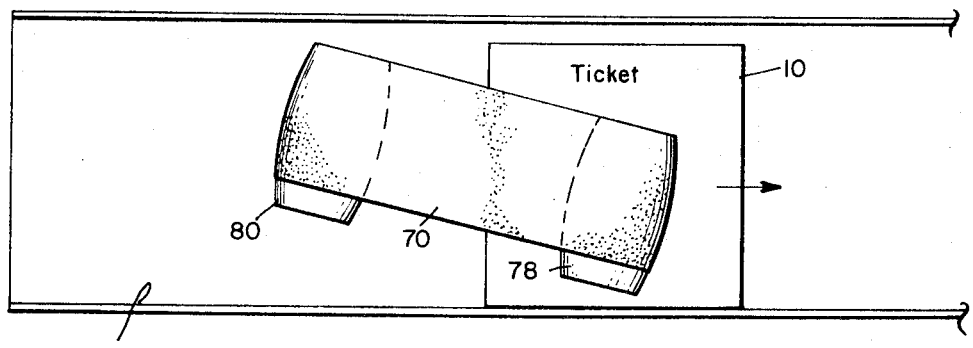

Referring now to FIG. 4 there is shown a pair of diagrams, 4a and 4b, illustrating how the driving endless belt 70 is moved laterally across the face of the crowned driving roller 78 and the crowned idler roller 80. FIG. 4a illustrates the position of the belt 70 before the ticket 10 is engaged by the rotating belt. In this position the belt 70 will automatically align itself on the rollers 78 and 80 due to the crowned configuration of both rollers 78 and 80. When the ticket 10 is inserted so as to be frictionally engaged by the rotating belt 70, it will become apparant that due to the skewed action of the belt be relative to the guide 64 that the ticket 10 will be urged against the lower guide surface 64.

There is no relative movement between the ticket 10 and the belt 70 due to the friction between the ticket and the belt. Since the card is restrained by the guide 64 the belt is forced to react by moving across the surface of the crowned rollers 78 and 80 as shown in connection with FIG. 4b. It is this moving of the belt across the roller surfaces that insures that the ticket is held in a guiding relationship against the linear guide means 64 since the lateral movement of the belt is a direct reation of the force holding the ticket against the guide means.

It can be appreciated therefore that as a result of the frictional contact between the moving belt 70 and the ticket 10 at all times throughout the passage of the ticket within the card transport mechanism that high speed operation of the ticket is now possible without the resulting disadvantages of flying or undulating movement of the ticket and further that the frictional engagement between the drive belt and the ticket at all times results in a positive registration of the ticket against the guide means 64 at all times without generating a sliding friction between the ticket and the driving belt. As a result of the ticket being positively held by the driving belt, there is no slipping or spurting of the ticket.

What is claimed is:
1. In combination:
    a plurality of magnetic stations for reading and writing magnetically encoded information from a card;
    a fixed linear guide means for guiding said card through each of said stations; and
    endless belt driving means skewed at an angle with respect to said linear guide means for continuously urging said card against said guide means for frictionally engaging and driving said card through each of said stations thereby insuring registration of said card with each of said magnetic stations.
2. A combination according to claim 1 in which said magnetic stations included a read head and a write head aligned perpendicularly with respect to said linear guide means for reading and writing magnetically encoded information from and to said card.
3. A combination according to claim 1 which includes a plurality of resilient rollers, one for each magnetic station, frictionally engaged and rotated by said endless belt driving means and aligned with each of said magnetic stations respectively for maintaining said card in a preferred relationship when reading and writing the magnetically encoded information from and to said card.
4. The combination of:
    a plurality of magnetic stations for reading and writing magnetically encoded information from a card;
    a fixed linear guide means for guiding said card through each of said stations; and
    endless belt driving means for frictionally engaging and driving said card through each of said stations, including a continuous belt, said continuous belt riding on a first roller and a second roller for moving said belt at an angle with respect to said fixed linear guide means.
5. A combination according to claim 4 in which said first roller and said second roller are crowned in the center for improving the self centering capabilities of said endless belt and to allow said belt to maintain a frictional contact with said card and prevent relative movement between the card and said belt while the card is being moved from station to station.
6. A combination according to claim 4 which includes a single drive motor connected to said first roller for driving said endless belt.
7. A combination according to claim 6 which includes enabling means responsive to the presence of a card for energizing said driving motor.
8. A magnetic card handling mechanism comprising;
    a pair of aligned magnetic heads for reading and writing magnetically encoded information from and to a card respectively,
    a fixed linear guide means for guiding said card past each of said heads,
    a first roller and a second roller located above said magnetic heads for rotating an endless belt at an angle with respect to said fixed linear guide means,
    said endless belt being adapted to frictionally engage and move said card from head to head,
    a pair of resilient rollers each aligned with said reading head and said writing head respectively frictionally engaged and rotated by said endless belt and located within the endless loop of said endless belt for maintaining said said card in a preferred relationship when reading and writing magnetically encoded information from said heads,
    a single driving motor connected to said first roller for driving said endless belt, and
    a card switch responsive to the presence of a card for energizing said driving means.

* * * * *